United States Patent [19]

Dalke

[11] 4,364,085
[45] Dec. 14, 1982

[54] COLORIZED WEATHER SATELLITE CONVERTER

[75] Inventor: James Dalke, Bellevue, Wash.

[73] Assignee: Arvin Industries, Inc., Columbus, Ind.

[21] Appl. No.: 142,781

[22] Filed: Apr. 22, 1980

[51] Int. Cl.³ .................. H04N 9/02; H04N 9/535
[52] U.S. Cl. ................................ 358/81; 358/109
[58] Field of Search ............... 358/81, 82, 108, 109

[56] References Cited

U.S. PATENT DOCUMENTS

| | | |
|---|---|---|
| 2,819,336 | 1/1958 | Herbst . |
| 3,617,630 | 11/1971 | Reiffel . |
| 3,749,823 | 7/1973 | Warner .................. 358/81 |
| 4,148,070 | 4/1979 | Taylor . |
| 4,149,184 | 4/1979 | Giddings et al. .......... 358/81 |
| 4,196,447 | 4/1980 | Dalke .................... 358/82 |

Primary Examiner—Robert L. Richardson
Attorney, Agent, or Firm—Biebel, French & Nauman

[57] ABSTRACT

Cloud cover information over a selected portion of the earth, such as that obtained from a satellite (10) is converted into digital form and stored in a picture memory RAM (40). The memory can be interrogated and displayed on a television monitor (100) or transmitted by a television station (110). Geographical information, such as the location of water bodies and land masses, stored in a map memory ROM (50), and this memory is interrogated at the same time as the picture memory to generate a color subcarrier which is added to the video from the picture memory. The hue of the combined picture is varied according to the intensity of the video signal from the picture memory by means of a combinational logic circuit (60). The combined black and white video from the picture memory RAM and the color subcarrier generated by the map memory ROM will provide a composite video signal with water bodies represented by a color different from the color representing land masses and where the intensity of the color generated will be an inverse function of the intensity of the video signal.

5 Claims, 5 Drawing Figures

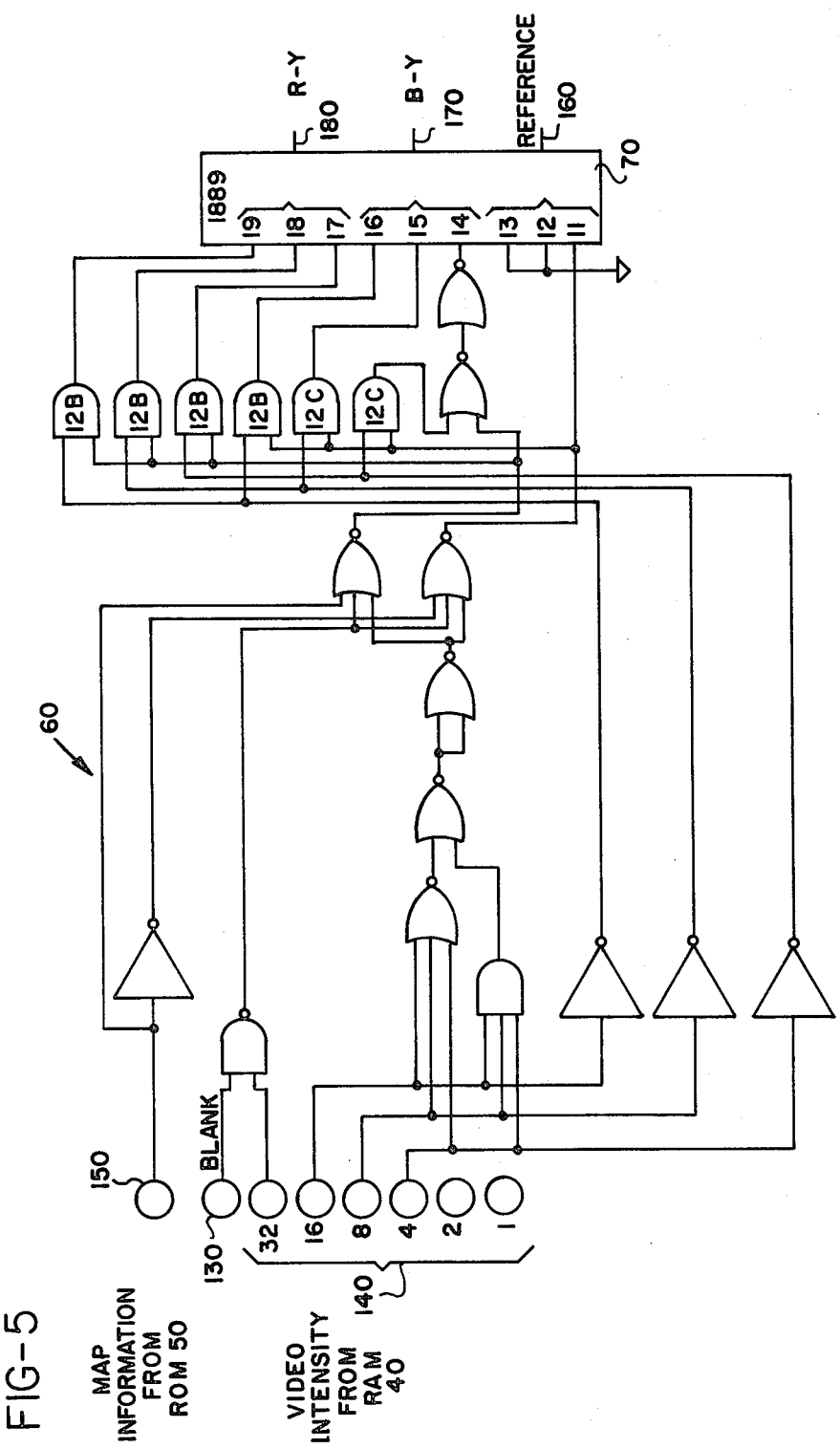

COLORIZED WEATHER SATELLITE CONVERTER

BACKGROUND OF THE INVENTION

This invention relates to a method and apparatus for colorizing a video picture of a specified geographical area wherein different geographical features, such as land masses and water bodies, are represented by different colors.

This invention has particular utility in connection with the display on a television set information obtained from orbiting satellites. The invention may also be used in connection with ground-based radar systems wherein different geographical or political areas can be distinguished by different colors on the television screen.

On difficulty with the typical black and white weather pictures obtained from either orbiting satellites or from ground-based radar is in distinguishing land masses from water bodies, and also in distinguishing differences in the intensity of the luminance level of the cloud cover within a displayed picture.

SUMMARY OF THE INVENTION

This invention relates to a method and apparatus for colorizing black and white video pictures of specified geographical areas. A map memory is provided for each geographical area to be displayed or which may be recorded in a picture memory device. The map memory contains information regarding the location of the geographical areas to be identified, such as land masses and water bodies.

Both the picture memory and the map memory are interrogated simultaneously and the video intensity information from the picture memory combined with the output of the map memory to generate a color subcarrier.

The intensity of the color subcarrier is a function of the intensity of the black and white signal generated by the picture memory, and land masses and water bodies without cloud cover will be shown in full color; and as the cloud cover intensity increases, the color saturation will be reduced until the cloud cover intensity reaches a predetermined level.

In a preferred embodiment, as the cloud cover intensity changes, the hue of the color will also change. This not only gives a pleasing appearance to the combined picture, but also allows the viewer to distinguish between different intensity levels.

Accordingly, it is an object of this invention to provide a method for presenting, in standard public television format, weather pictures comprising black and white video signals showing cloud cover, the method comprising the steps of selecting a portion of the video signal for a given geographical area and storing said selected portion in a temporary memory, storing in a second memory information representing the location of water bodies and land masses within said given geographical area, simultaneously interrogating both memories, generating a color sub-carrier based on the intensity information contained in the video signal stored in temporary memory and the water bodies and land masses location information stored in said second memory, and combining the stored black and white video signals and the color sub-carrier thereby to produce a composite picture in standard public television format.

It is also an object of this invention to provide a color television weather display system comprising: means responsive to an input signal containing information representing the cloud cover over a selected portion of the earth for generating a black and white video signal; map memory means storing information representing the location of specified geographical areas; means for interrogating said map memory means as said black and white video signal is generated; means responsive to the intensity information contained in said black and white video signal and the location of said specified geographical areas for generating a color subcarrier; and means combining the black and white video signal and the color subcarrier for producing a composite video signal whereby the different geographical areas are represented by different colors and whereby the intensity of each color generated is an inverse function of the intensity of the video signal representing cloud cover.

These and other objects and advantages of the invention will be apparent from the following description, the accompanying drawings and the appended claims.

BRIEF DESCRIPTION OF THE DRAWINGS

FIG. 5 is an electrical schematic drawing of the combinational logic circuit.

DESCRIPTION OF THE PREFERRED EMBODIMENT

Figure 1:
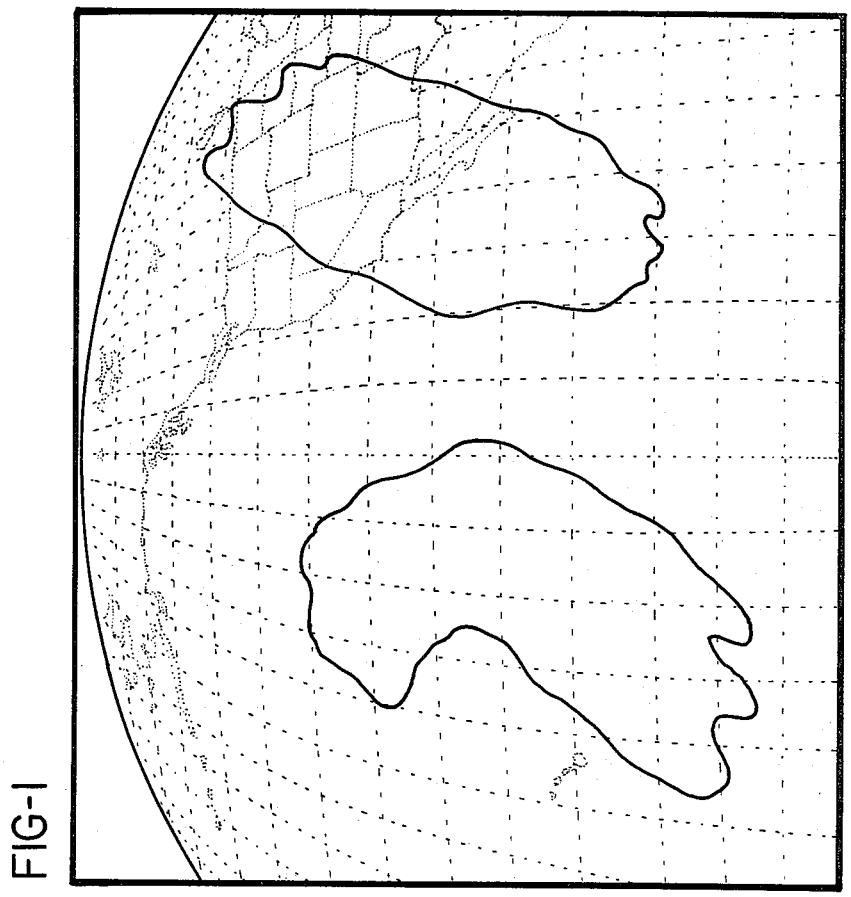
FIG. 1 is a view of the earth as taken from the GOES WEST satellite showing a representative picture of the cloud cover over a portion of the western United States and Pacific Ocean.

Referring now to the drawings which illustrate a preferred embodiment of the invention, and particularly to FIG. 1 which is a view of the earth taken from the GOES WEST satellite showing a portion of the western United States and Pacific Ocean. In this particular view, there are two large areas shown covered by cloud, one over the ocean, the other over both the ocean and the western United States.

In this particular view, latitude and longitude lines, the outlines of the land masses, and political boundries have been added to the satellite view by the National Oceanic and Atmospheric Administration.

Figure 4:
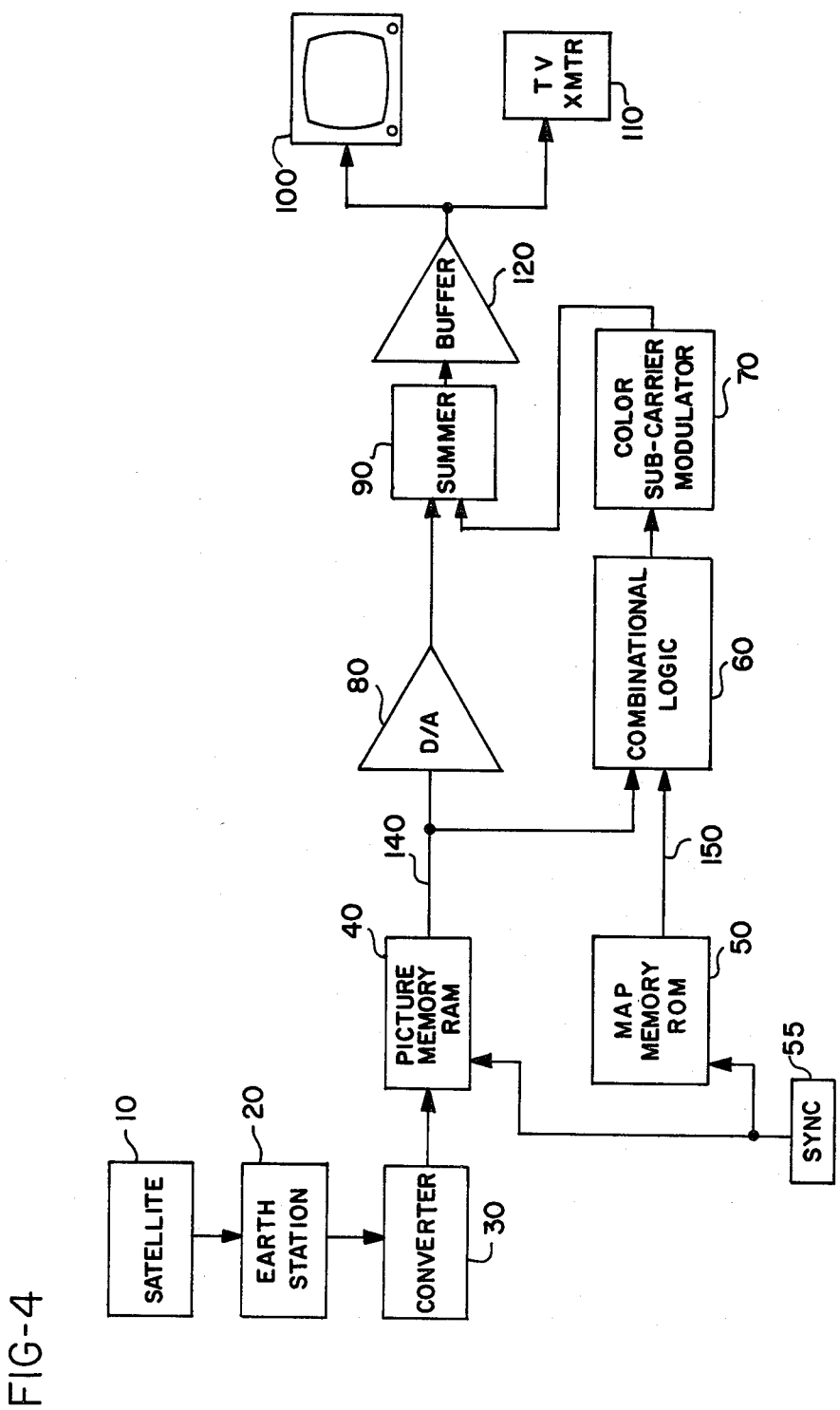
FIG. 4 is a simplified electrical block diagram of a color television satellite weather display system.

Referring briefly to FIG. 4, information from the satellite 10 is transmitted by radio to an earth station 20, where the information is stored, sectorized, enhanced, and where the latitude, longitude and political boundary markings are added to the picture. These sectorized pictures are then re-transmitted to the users, either by phone line, or back through the satellite.

The satellite picture information or a portion thereof, is detected by a converter 30, and stored in a picture memory RAM 40. As described in U.S. Pat. No. 4,196,447, the picture memory RAM is a 256×256×6 random access memory, and the converter 30 allows picture information to be read into the memory 40 at one rate from the satellite while at substantially the same time allowing the information stored therein to be interrogated at a television compatible rate.

Since the RAM 40 is 6 bits deep, 64 levels of luminance from the satellite can be recorded therein. This is far less resolution than is available from the satellite (256 gray shades); however, since the maximum number of gray shades that can be seen is from about 15 to about 40, the 64 levels stored in the picture RAM 40 are more than adequate for proper display of the satellite picture.

Therefore, the picture of FIG. 1 as received from the satellite picture storage center 20 will be converted into a 256×256×6 image and stored in the picture memory RAM 40 as a black and white picture which can then be displayed on a television screen.

In the black and white weather picture of FIG. 1, it is difficult to distinguish land masses from water bodies, and also to distinguish significant differences in the intensity of the luminance level of the cloud cover within the picture. In the simplified explanation given hereafter, it will be assumed that the intensity of the light reflected or the radiation received from the earth's surface without cloud cover is relatively uniform, and that the luminance levels within the cloud formation shown vary in intensity, at least to the extent later to be explained.

Since there are a limited number of sectorized pictures available to users from the storage center, it becomes practical to create a map or underlay of each sectorized picture, and thereby to create a composite color picture wherein the land masses would be given one color and the water bodies another contrasting color.

Figure 2:
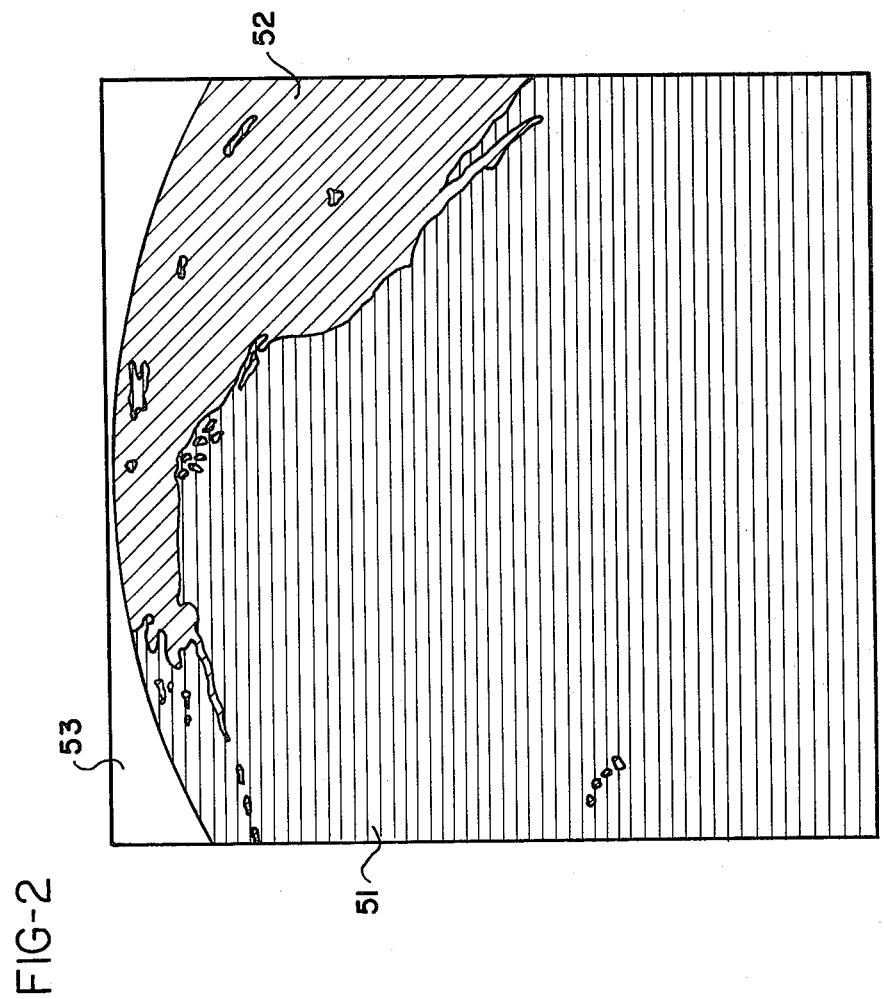
FIG. 2 is a map of the same geographical area as shown in FIG. 1 wherein the land masses are colored green and the water bodies colored blue.

In a preferred embodiment of this invention, a map memory means or read-only memory 50 is employed which contains the map information. One such map is shown in FIG. 2, and represents generally the same geographical area as covered by the sectorized picture of FIG. 1. Those areas representing water bodies 51 are indentified in the memory by the number "0" while those areas representing land masses 52 are identified in the memory by the number "1". As shown in FIG. 2, the shading for the water bodies is for the color blue, and the shading for the land masses is for the color green. The area 53 above the earth can be either color since that area will be distinguished either as all white or all black, depending upon whether an infrared or a visible picture is being received from the satellite.

The map memory 50 shown in FIG. 4 is a 128×128×1 read-only memory (ROM). The resolution of the color information to be added to the satellite weather picture can be significantly lower than the picture itself without distracting substantially from the appearance of the combined image.

When the picture memory RAM 40 is interrogated to develop a black and white video signal, the map memory ROM 50 is interrogated at the same time, under control of the sync circuit 55, and the digital intensity information from the picture RAM 40 and the color information from the map ROM 50 are fed into a combinational logic circuit 60 which provides an output to a color subcarrier modulator 70 for generating a color subcarrier.

The digital black and white picture information from RAM 40 is applied to a digital-to-analog (D/A) circuit 80, and its output, along with the color subcarrier signal from the modulator 70 are combined in summer circuit 90 to produce a composite video signal whereby water bodies are represented by a color different from the color representing land masses. The output of the summer 90 may be connected to a television monitor 100 or transmitter 110 through a buffer 120.

The intensity of each color generated will be an inverse function of the intensity of the video signal representing cloud cover.

Figure 3:
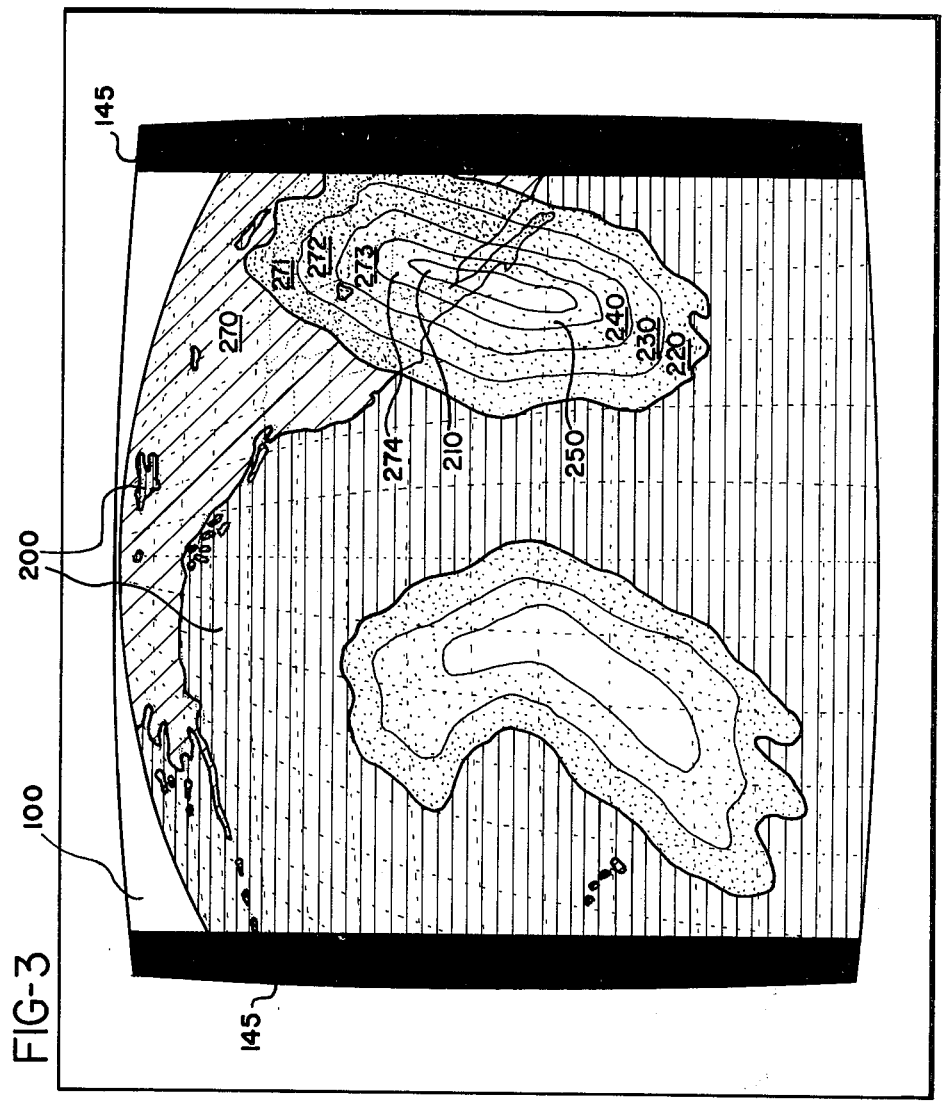
FIG. 3 is a composite view combining the information from FIGS. 1 and 2.

As shown in FIG. 3, the intensity of the return from the cloud formations will vary within each formation, and in this view, it is assumed that there are three variations or grades of intensity in the cloud shown to the left, and five variations in intensity in the cloud shown to the right. Further, it is assumed for this explanantion that there is no difference in intensity of the luminance levels over the land masses and water bodies absent cloud.

The luminance level or video intensity level for each pixel or picture element to be displayed on the television screen is stored as a 6-bit number in the picture memory RAM 40. The combinational logic circuit 60 senses the luminance level and provides an output to the color subcarrier modulator 70, and this output is combined with the output of the D/A 80 to provide a colorized TV picture.

If the luminance level output from the RAM 40 for a particular pixel is less than a predetermined number but greater than black, then the land masses and the water bodies will be represented by their respective colors. As the luminance level increases between the first predetermined level and a second higher, predetermined level, then the intensity of the color signal will decrease, and in addition, in the preferred embodiment of the invention, the hue of the color will change slightly with changes in the luminance level.

For luminance levels exceeding the second predetermined level, the color modulator will be cut off, and no color added to the output of the picture RAM 40.

The combinational logic circuit 60 and color modulator 70 are shown in FIG. 4. Luminance information from the picture memory 40 is carried by cable 140 to six input terminals marked 1, 2, 4, 8, 16, and 32. Terminal 130 is a blanking terminal which prevents any color signals from being generated at the edges of the screen. As shown in FIG. 3, a weather picture is essentially square while the television screen is retangular, and therefore the right and left edges of the television picture 145 are blanked.

The map memory ROM 50 is connected to the combinational logic circuit 60 by line 150. This line will assume a "1" level to represent land masses, and a "0" level to represent water bodies. As shown in FIG. 4, luminance level signals on input terminal 1 and 2 are ignored, and therefore this luminance level representing the first predetermined magnitude mentioned above is greater than a numeric 4. Luminance levels greater than the second predetermined magnitude, a numeric "32" in the present invention, will result in no color output from the modulator 70. The combinational logic circuit 60 contains AND gates, NOR gates, and inverters which work in combination to provide a plurality of inputs to the color modulator 70. The color modulator 70 is a type 1889 color chip commonly available and used in television games, and has 3 sets of inputs each 3 bits deep, and three outputs 160, 170, and 180 representing the signals R-Y, B-Y and ref sign to control the color subcarrier modulation. Inputs 11, 12, and 13 control the red output 160; inputs 14, 15, and 16 control the green output 170; and inputs 17, 18, and 19 control the blue output 180.

Reference to Tables I and II and FIG. 3 will assist in understanding the operation of the combinational logic circuit 60. The video intensity level on cable 140 from the picture memory RAM 40 is represented by the left-hand column in both tables. The output of the combinational logic 60, or the input to a color modulator 70, for each luminance level between the first and the second levels is given in the columns to the right.

For cloud cover over water bodies, an intensity level of "000000" will result in no color output from the modulator 70; an intensity level "000100" or "4", and therefore greater than the first predetermined magnitude, will produce an output of the greatest color saturation, namely, a binary "110" output or a numeric 7 level output of blue, and a binary "001" or a numeric 1 level output of green, as shown at 200 in FIG. 3. By adding a slight amount of green to the basically blue output representing water bodies, the hue of the color generated from the modulator 70 will change as the video intensity level increases. Thus, when the video intensity level reaches binary "011100" or numeric 28, there will again be no color output from the modulator 70, all of the inputs thereto being binary 0's. This allows cloud formations at this level or brighter to appear on the television screen as pure white, as shown at 210 in FIG. 3.

In FIG. 3, the light reflected or other radiation from the clouds will vary in intensity, and for purposes of explanation, the cloud shown covering the western United States shows four intermediate levels of gray. Over the water, the combinational logic circuit 60 will generate a binary 001 or number 1 for the color green within these intermediate areas, and in addition may produce the following codes for the color blue: a binary 101 or numeric 5 for other areas marked 220; a binary 100 (4) for the area marked 230; a binary 011 (3) for the area marked 240; and a binary 001 (1) for the area marked 250.

Thus, the ratio of blue to green in this example changes from 5:1 down to 1:1 as the intensity of the luminance levels within the cloud increases. This change in the hue of the color presented on the television screen assists the viewer in interpreting the cloud patterns and also gives the clouds the appearance of having transparency, especially around their edges.

Similarly, Table II represents the output of the combinational logic when line 150 from the map memory ROM is at the level "1". In this case, there is one unit of red added to the predominantly green color representing the land mass 270. Again, as the intensity level changes, the hue will change due to the change in ratio between the two color signals, as respesented by the different areas 270-274.

TABLE I

| Video Intensity Level: | | | | WATER BODIES (Line 150 = "0") | | | | | | | | |
|---|---|---|---|---|---|---|---|---|---|---|---|---|
| | | | | COMBINATIONAL LOGIC OUTPUT | | | | | | | | |
| 32 | 16 | 8 | 4 | BLUE | | | GREEN | | | RED | | |
| 0 | 0 | 0 | 0 | 0 | 0 | 0 | 0 | 0 | 0 | 0 | 0 | 0 |
| 0 | 0 | 0 | 1 | 1 | 1 | 0 | 0 | 0 | 1 | 0 | 0 | 0 |
| 0 | 0 | 1 | 0 | 1 | 0 | 1 | 0 | 0 | 1 | 0 | 0 | 0 |
| 0 | 0 | 1 | 1 | 1 | 0 | 0 | 0 | 0 | 1 | 0 | 0 | 0 |
| 0 | 1 | 0 | 0 | 0 | 1 | 1 | 0 | 0 | 1 | 0 | 0 | 0 |
| 0 | 1 | 0 | 1 | 0 | 1 | 0 | 0 | 0 | 1 | 0 | 0 | 0 |
| 0 | 1 | 1 | 0 | 0 | 0 | 1 | 0 | 0 | 1 | 0 | 0 | 0 |
| 0 | 1 | 1 | 1 | 0 | 0 | 0 | 0 | 0 | 0 | 0 | 0 | 0 |

TABLE II

| Video Intensity Level: | | | | LAND MASSES (Line 150 = "1") | | | | | | | | |
|---|---|---|---|---|---|---|---|---|---|---|---|---|
| | | | | COMBINATIONAL LOGIC OUTPUT | | | | | | | | |
| 32 | 16 | 8 | 4 | BLUE | | | GREEN | | | RED | | |
| 0 | 0 | 0 | 0 | 0 | 0 | 0 | 0 | 0 | 0 | 0 | 0 | 0 |
| 0 | 0 | 0 | 1 | 0 | 0 | 0 | 1 | 1 | 0 | 0 | 0 | 1 |
| 0 | 0 | 1 | 0 | 0 | 0 | 0 | 1 | 0 | 1 | 0 | 0 | 1 |
| 0 | 0 | 1 | 1 | 0 | 0 | 0 | 1 | 0 | 0 | 0 | 0 | 1 |
| 0 | 1 | 0 | 0 | 0 | 0 | 0 | 0 | 1 | 1 | 0 | 0 | 1 |
| 0 | 1 | 0 | 1 | 0 | 0 | 0 | 1 | 0 | 0 | 0 | 0 | 1 |
| 0 | 1 | 1 | 0 | 0 | 0 | 0 | 0 | 0 | 1 | 0 | 0 | 1 |
| 0 | 1 | 1 | 1 | 0 | 0 | 0 | 0 | 0 | 0 | 0 | 0 | 0 |

Thus, this invention provides for the colorizing of black and white weather pictures, such as those obtained from weather satellites, by using a map memory containing geographical information, such as the location of water bodies and land masses, to generate a color sub-carrier. The intensity and hue of the color signal added to the black and white weather picture will be a function of the intensity of the video signal.

While the method herein described, and the form of apparatus for carrying this method into effect, constitute preferred embodiments of this invention, it is to be understood that the invention is not limited to this precise method and form of apparatus, and that changes may be made in either without departing from the scope of the invention which is defined in the appended claims.

I claim:

1. Method for presenting, in standard public television format, weather pictures comprising black and white video signals showing cloud cover, the method comprising the steps of selecting a portion of the video signal for a given geographical area and storing said selected portion in a temporary memory, storing in a second memory information representing the location of water bodies and land masses within said given geographical area, simultaneously interrogating both memories, generating a color sub-carrier which is modulated by the intensity information contained in the video signal stored in temporary memory and the water bodies and land masses location information stored in said second memory, and combining the stored black and white video signals and the modulated color sub-carrier thereby to produce a composite picture in standard public television format.

2. A color television weather display system comprising means responsive to an input signal containing information representing the cloud cover over a selected portion of the earth for generating a black and white video signal, map memory means storing information representing the location of specified geographical areas, means for interrogating said map memory means as said black and white video signal is generated, means for generating a color subcarrier modulated by the intensity information contained in said black and white video signal and the location of said specified geographical areas from said map memory means, and means combining the black and white video signal and the color subcarrier for producing a composite video signal whereby the different geographical areas are represented by different colors and whereby the intensity of each color generated is an inverse function of the intensity of the video signal representing cloud cover.

3. A color television weather display system comprising means responsive to an input signal containing information representing the cloud cover over a selected portion of the earth for generating a black and white video signal, map memory means for storing information representing the location of water bodies and land masses within the selected portion of the earth, means for interrogating said map memory means as said black and white video signal is generated, means for generating a color subcarrier modulated by the intensity information contained in said black and white video signal and the water bodies and land masses location information from said map memory means, and means for combining the black and white video signal and the color subcarrier to produce a composite video signal whereby water bodies are represented by a color different from the color representing the land masses and where the intensity of each color generated is an inverse function of the intensity of the video signal representing cloud cover.

4. A color television weather display system comprising means responsive to an input signal containing information representing the cloud cover over a selected portion of the earth for generating a black and white video signal, map memory means for storing information representing the location of water bodies and land masses within the selected portion of the earth, means for interrogating said map memory means as said black and white video signal is generated, means for generating a color subcarrier modulated by the intensity information contained in said black and white video signal and the water bodies and land masses location information from said map memory means, means for varying the hue of the color generated in response to level of intensity of the black and white video signal, and means for combining the black and white video signal and the color subcarrier to produce a composite video signal whereby water bodies are represented by a color different from the color representing the land masses an where the intensity of each color generated is an inverse function of the intensity of the video signal representing cloud cover.

5. A color television weather display system comprising means responsive to an input signal containing information representing the cloud cover over a selected portion of the earth for generating a black and white video signal, map memory means for storing information representing the location of water bodies and land masses within the selected portion of the earth, means for interrogating said map memory means as said black and white video signal is generated, means for generating a color subcarrier modulated by the intensity information contained in said black and white video signal and the water bodies and land masses location information from said map memory means, means responsive to video intensity level signals above a first predetermined magnitude and below a second predetermined magnitude for generating a plurality of color signals with the ratio of the intensity of the colors signals being a function of the actual intensity information in said black and white video signal, and means for combining the black and white video signal and the color subcarrier to produce a composite video signal whereby water bodies are represented by a color different from the color representing the land masses and where the intensity and hue of each color generated is a function of the intensity of the video signal representing cloud cover.

* * * * *